(12) United States Patent
Ogino

(10) Patent No.: US 7,359,456 B2
(45) Date of Patent: Apr. 15, 2008

(54) COMMUNICATION SYSTEM AND COMMUNICATION DEVICE

(75) Inventor: Toshikazu Ogino, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 645 days.

(21) Appl. No.: 10/779,415

(22) Filed: Feb. 13, 2004

(65) Prior Publication Data
US 2004/0170224 A1  Sep. 2, 2004

(30) Foreign Application Priority Data
Feb. 27, 2003  (JP) ............................. 2003-051269

(51) Int. Cl.
*H03K 7/06* (2006.01)

(52) U.S. Cl. ..................... 375/303; 375/135; 375/259; 375/220; 375/136; 375/147; 375/329; 375/240.03

(58) Field of Classification Search ............... 375/259, 375/135, 146, 220, 240.03, 303, 272, 136, 375/147, 329; 378/705; 340/5.2; 348/705
See application file for complete search history.

(56) References Cited

U.S. PATENT DOCUMENTS 4,468,790 A * 8/1984 Hofelt ........................ 375/245
5,471,209 A * 11/1995 Sutterlin et al. ............ 341/143
5,579,060 A * 11/1996 Elberbaum .................. 348/705
5,812,607 A * 9/1998 Hutchinson et al. ........ 375/322
6,346,874 B1 * 2/2002 Maeshima .................. 340/5.2
6,661,336 B1 * 12/2003 Atkins et al. .............. 340/10.2

FOREIGN PATENT DOCUMENTS

JP  10-015245  1/1998

\* cited by examiner

*Primary Examiner*—Shuwang Liu
*Assistant Examiner*—Kabir A Timory
(74) *Attorney, Agent, or Firm*—Ladas & Parry LLP

(57) ABSTRACT

A communication system for transmitting a transmission signal in digital form from a transmitter to a receiver is disclosed. The transmitter includes a modulation part modulating a carrier wave in accordance with the transmission signal according to frequency modulation, a digital conversion part performing 1-bit quantization on the modulated signal obtained as a result of the modulation in the modulation part, and a transmission part transmitting digital data into which the modulated signal is converted in the digital conversion part. The receiver includes a reception part receiving the digital data transmitted from the transmission part, and a demodulation part demodulating the digital data received by the reception part according to the frequency modulation.

5 Claims, 8 Drawing Sheets

COMMUNICATION SYSTEM AND COMMUNICATION DEVICE

BACKGROUND OF THE INVENTION

1. Field of the Invention

The present invention relates generally to communication systems and communication devices, and more particularly to a communication system and a communication device for transmitting a signal in digital form.

2. Description of the Related Art

A 2.4 GHz band wireless communication LAN (local area network) system is open to the public as a conventional wireless communication system for transmitting digital data. In the case of transmitting a video signal in digital form using such a wireless communication system, the video signal, after being converted to digital data, is compressed into a packet, using a predetermined information compression technique provided by MPEG (Moving Picture Experts Group) or JPEG (Joint Photographic Experts Group), and then transmitted as disclosed in Japanese Laid-Open Patent Application No. 10-015245.

As described above, according to the conventional wireless communication system, the video signal, after being converted into digital form, is further compressed using a predetermined information compression technique provided by MPEG or JPEG and transmitted packet by packet. Accordingly, it takes time to perform processing, so that there occurs a time lag between the images of transmitting and receiving ends. For instance, if a time lag occurs between the images of transmitting and receiving ends, there occurs a delay in understanding the current state, thus preventing a pertinent response from being made.

Further, using a predetermined information compression technique provided by MPEG or JPEG incurs an increase in costs.

SUMMARY OF THE INVENTION

Accordingly, it is a general object of the present invention to provide a communication system and a communication device in which the above-described disadvantages are eliminated.

A more specific object of the present invention is to provide a communication system and a communication device that can easily transmit a signal in digital form with reduced delay.

The above objects of the present invention are achieved by a communication system for transmitting a transmission signal in digital form from a transmitter to a receiver, wherein: the transmitter includes: a modulation part modulating a carrier wave in accordance with the transmission signal according to frequency modulation; a digital conversion part performing 1-bit quantization on a modulated signal obtained as a result of the modulation in the modulation part; and a transmission part transmitting digital data into which the modulated signal is converted in the digital conversion part; and the receiver includes: a reception part receiving the digital data transmitted from the transmission part; and a demodulation part demodulating the digital data received by the reception part according to the frequency modulation.

According to the above-described communication system, a modulated signal obtained by modulating a carrier wave by a transmission signal according to frequency modulation is subjected to 1-bit quantization to be converted to digital data, and the digital data is transmitted. As a result, the digital data can be transmitted without performing complicated processing such as compression, and the receiver side can restore the original transmission signal by directly demodulating the received digital data according to frequency modulation.

Accordingly, complicated processing such as compression and decompression of the digital data are unnecessary on the transmitter and receiver ends. Therefore, signal transmission delay can be minimized. Further, the transmission signal can be transmitted successively like an analog transmission. Accordingly, even if the signal is temporarily lost during transmission, unlike in the case of data loss in transmitting digital data compressed by MPEG or JPEG, this may have only a slight influence such as superimposition of noise on video or audio, thus producing no great disorder. Further, the above-described communication system may be simplified in configuration, thus reducing costs.

The above objects of the present invention are also achieved by a communication device for transmitting a transmission signal in digital form, including: a modulation part modulating a carrier wave in accordance with the transmission signal according to frequency modulation; a digital conversion part performing 1-bit quantization on a modulated signal obtained as a result of the modulation in the modulation part; and a transmission part transmitting digital data into which the modulated signal is converted in the digital conversion part.

The above objects of the present invention are further achieved by a communication device for receiving transmitted digital data, the digital data being obtained by modulating a carrier wave in accordance with a transmission signal according to frequency modulation and performing 1-bit quantization on a modulated signal obtained as a result of the modulation, the communication device including: a reception part receiving the transmitted digital data; and a demodulation part demodulating the digital data received by the reception part according to the frequency modulation, and restoring the transmission signal.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is give below, with reference to the accompanying drawings, of an embodiment of the present invention.

In this embodiment, a video transmission system for transmitting a video signal is taken as an example application of the present invention.

Figure 1:
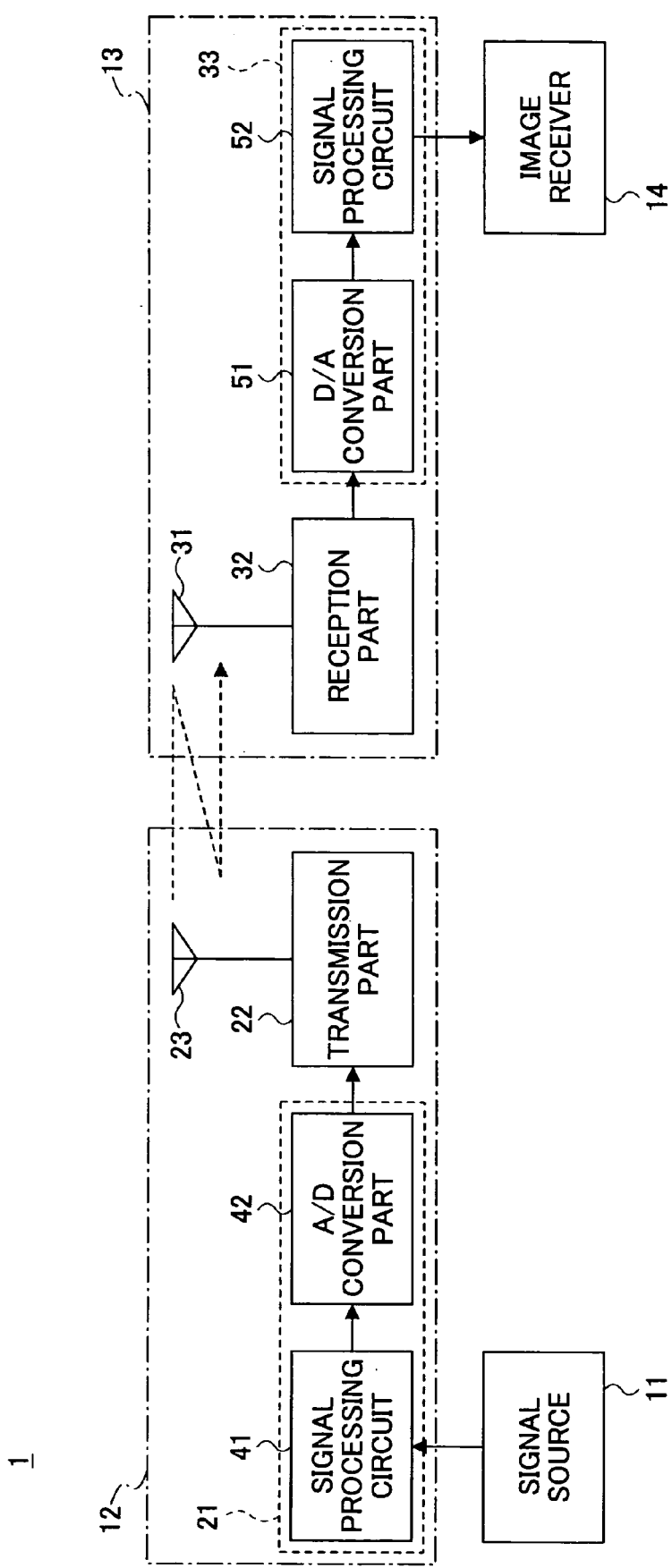
FIG. 1 is a schematic diagram showing a video transmission system according to an embodiment of the present invention.

FIG. 1 is a diagram showing a video transmission system 1 according to the embodiment of the present invention.

The video transmission system 1 includes a signal source 11, a transmitter 12, a receiver 13, and an image receiver 14.

The signal source 11 is a video camera, for instance. The signal source 11 outputs an audio signal obtained by a microphone and an NTSC (National Television Standards Committee) video signal obtained by an image capturing device. The video and audio signals output from the signal source 11 are supplied to the transmitter 12.

The transmitter 12 includes a signal processing part 21, a transmission part 22, and an antenna 23.

The signal processing part 21, composed of a single-chip IC (integrated circuit), for instance, contains a signal processing circuit 41 and an analog-to-digital (A/D) conversion part 42. The signal processing part 21 modulates and converts the video and audio signals supplied from the signal source 11 into digital data.

A description is first given of the signal processing circuit 41.

Figure 2:
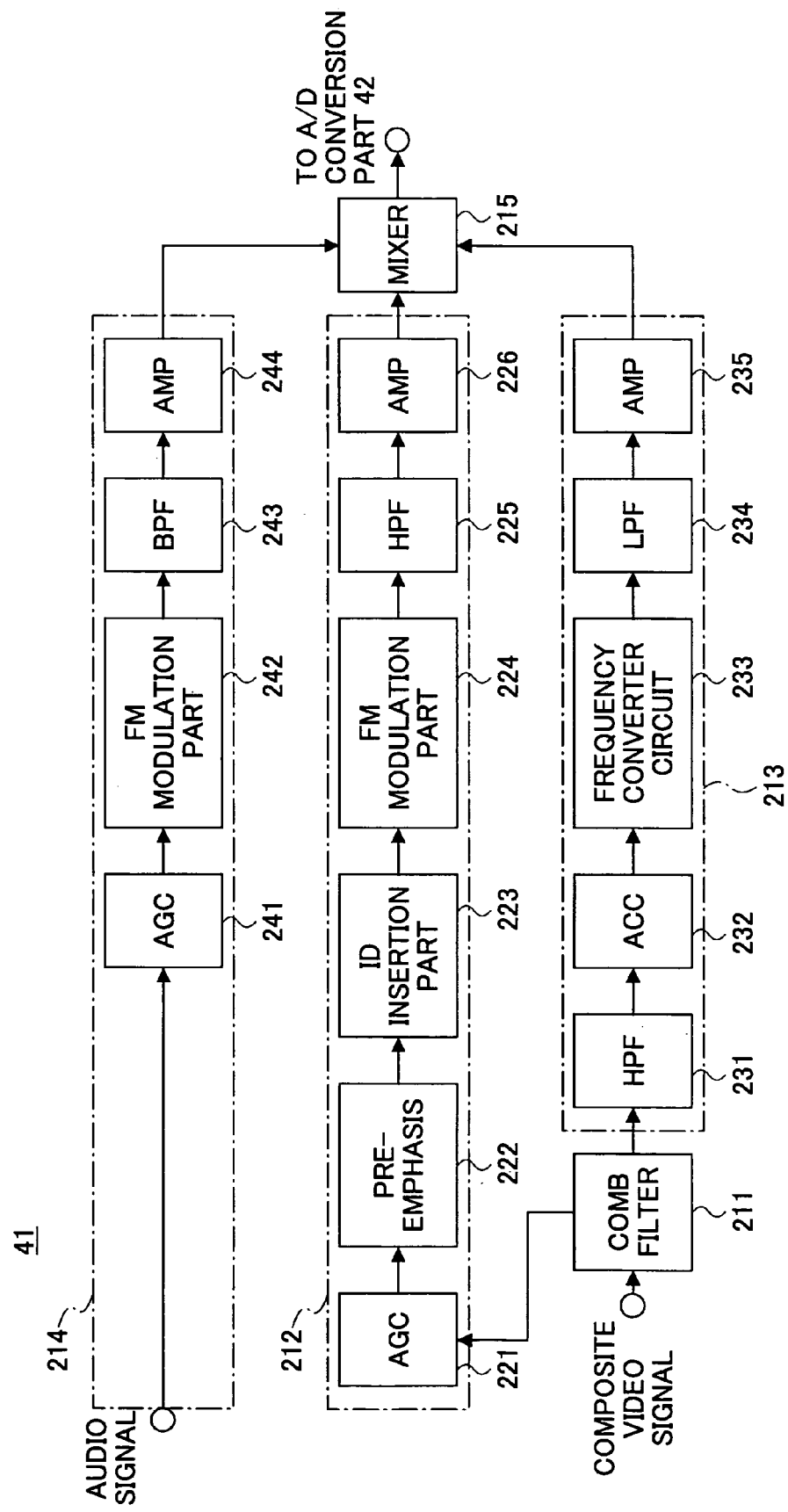
FIG. 2 is a block diagram showing a signal processing circuit of a transmitter according to the embodiment of the present invention.

FIG. 2 is a block diagram showing the signal processing circuit 41.

The signal processing circuit 41 includes a comb filter 211, a luminance signal processing part 212, a chrominance signal processing part 213, an audio signal processing part 214, and a mixer 215.

The comb filter 211 is supplied with the video signal from the signal source 11. The comb filter 211 has a frequency characteristic like comb teeth, and separates luminance signal components and a chrominance signal component. The luminance signal components separated by the comb filter 211 are supplied to the luminance signal processing part 212.

The luminance signal processing part 212 includes an automatic gain control (AGC) circuit 221, a pre-emphasis circuit 222, an identification (ID) insertion part 223, a frequency modulation (FM) part (FM modulation part) 224, a high-pass filter (HPF) 225, and an amplifier circuit (AMP) 226.

The AGC circuit 221 is supplied with the luminance signal from the comb filter 211. The AGC circuit 221 detects a signal level, and amplifies and outputs the luminance signal while performing gain control so as to make constant the level of a synchronization signal contained in the luminance signal. As a result, constant luminance may be obtained irrespective of the level of the luminance signal.

The luminance signal, having its amplitude controlled in the AGC circuit 221, is supplied to the pre-emphasis circuit 222. The pre-emphasis circuit 222 emphasizes a high frequency component in the luminance signal.

The luminance signal, having its high frequency component emphasized in the pre-emphasis circuit 222, is supplied to the ID insertion part 223. The ID insertion part 223 inserts an ID signal between vertical synchronizing pulses in a vertical blanking interval of the luminance signal.

Figure 3:
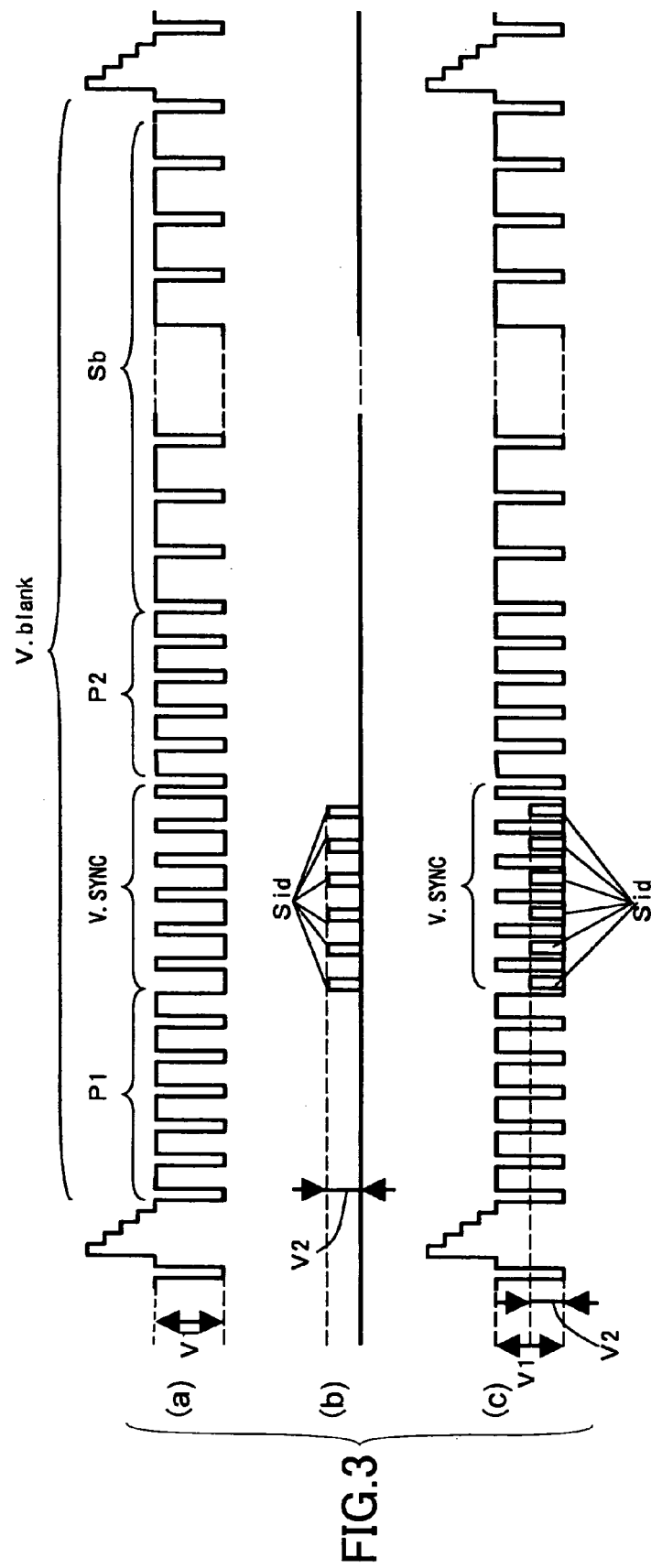
FIG. 3 is a wave form diagram for illustrating the operation of an ID insertion part of the signal processing circuit according to the embodiment of the present invention.

FIG. 3 is a diagram for illustrating the operation of the ID insertion part 223. In FIG. 3, (a) indicates the input luminance signal supplied to the ID insertion part 223, (b) indicates ID signals inserted into the input luminance signal, and (c) indicates the output luminance signal of the ID insertion part 223.

The pre-emphasis circuit 222 supplies the ID insertion part 223 with the luminance signal as shown in (a) of FIG. 3. A portion of a vertical blanking interval V.blank is extracted from the luminance signal and shown in (a) of FIG. 3. The vertical blanking interval V.blank, which is set to 20H (H=63.5 μs), includes equivalent pulses P1 and P2, vertical synchronizing pulses V.SYNC, and a burst signal Sb. The equivalent pulses P1 are a signal for causing interlacing to be performed with accuracy, and are provided for 3H. The vertical synchronizing pulses V.SYNC are a signal for establishing vertical synchronization of scanning lines, and are provided for 3H after the equivalent pulses P1. The equivalent pulses P2 are provided for 3H after the vertical synchronizing pulses V.SYNC. The burst signal Sb is inserted in the remaining period after the equivalent pulses P2.

The ID insertion part 223 generates a plurality of ID signals Sid with timing as shown in (b) of FIG. 3 for the vertical synchronizing pulses V.SYNC in the vertical blanking interval V.blank shown in (a) of FIG. 3. The ID insertion part 223 superimposes the ID signals Sid shown in (b) of FIG. 3 on the luminance signal shown in (a) of FIG. 3, thereby superimposing the ID signals Sid on the luminance signal. Each ID signal Sid represents a device ID and an individual ID in 3 bytes. The ID signals Sid are set to have an amplitude V2 smaller than an amplitude V1 of the vertical synchronizing pulses V.SYNC. As a result, the ID signals Sid and the vertical synchronizing pulses V.SYNC can be separated easily.

The luminance signal, into which the ID signals Sid have been inserted in the ID insertion part 223, is supplied to the FM modulation part 224. The FM modulation part 224 performs frequency modulation of a carrier wave of a predetermined frequency such as a frequency of approximately 3.9 MHz by the luminance signal supplied from the ID insertion part 223.

The modulated signal obtained as a result of the frequency modulation in the FM modulation part 224 is supplied to the high-pass filter 225. The high-pass filter 225 passes high-frequency signal components of and removes unnecessary low-frequency signal components from the modulated signal supplied from the FM modulation part 224. The signal passing through the high-pass filter 225 is supplied to the amplifier circuit 226. The amplifier circuit 226 amplifies the signal passing through the high-pass filter 225. The signal amplified by the amplifier circuit 226 is supplied to the mixer 215 as the output signal of the luminance signal processing part 212.

Next, a description is given of the chrominance signal processing part 213.

The chrominance signal processing part 213 includes a high-pass filter 231, an automatic color control (ACC) circuit 232, a frequency converter circuit 233, a low-pass filter (LPF) 234, and an amplifier circuit 235.

The high-pass filter 231 is supplied with the chrominance signal from the comb filter 211. The high-pass filter 231 passes high-frequency components including chrominance signal components of the chrominance signal supplied from the comb filter 211, and removes low-frequency components therefrom. The chrominance signal passing through the high-pass filter 231 is supplied to the ACC circuit 232. The ACC circuit 232 amplifies the chrominance signal while controlling amplifier gain so as to keep constant the amplitude of the chrominance signal. The chrominance signal, whose level has been controlled in the ACC circuit 232, is supplied to the frequency converter circuit 233. The frequency converter circuit 233 converts the frequency of the chrominance signal to a frequency band different from that of the luminance signal, such as a frequency of approximately 629 kHz.

The chrominance signal, whose frequency has been converted in the frequency converter circuit 233, is supplied to the low-pass filter 234. The low-pass filter 234 passes low-frequency components including the chrominance signal components of the chrominance signal, and removes unnecessary high-frequency components therefrom. The chrominance signal passing through the low-pass filter 234 is supplied to the amplifier circuit 235. The amplifier circuit 235 amplifies the chrominance signal passing through the low-pass filter 234. The chrominance signal amplified by the amplifier circuit 235 is supplied to the mixer as the output signal of the chrominance signal processing part 213.

Next, a description is given of the audio signal processing part 214.

The audio signal processing part 214 includes an AGC circuit 241, an FM modulation part 242, a bandpass filter (BPF) 243, and an amplifier circuit 244.

The AGC circuit 241 is supplied with the audio signal from the signal source 11. The AGC circuit 241 detects the level of the audio signal, and performs gain control in accordance with the detected level of the audio signal, thereby controlling the level of the audio signal so that the level of the audio signal falls within an appropriate range. The audio signal, controlled to an appropriate level in the AGC circuit 241, is supplied to the FM modulation part 242.

The FM modulation part 242 performs frequency modulation of a carrier wave of a predetermined frequency by the audio signal supplied from the AGC circuit 241. The modulated signal obtained as a result of the frequency modulation in the FM modulation part 242 is supplied to the bandpass filter 243.

The bandpass filter 243 passes signals of a predetermined frequency band, such as signals of a frequency band near 1.2 MHz, of the modulated signal supplied from the FM modulation part 242, and removes signals of the other unnecessary frequencies therefrom. The signal, after passing through the bandpass filter 243, is supplied to the amplifier circuit 244. The amplifier circuit 244 amplifies the signal having passed through the bandpass filter 243. The output signal of the amplifier circuit 244 is supplied to the mixer 215 as the output signal of the audio signal processing part 214.

The mixer 215 is supplied with the output signals of the luminance signal processing part 212, the chrominance signal processing part 213, and the audio signal processing part 214. The mixer 215 mixes and outputs the output signals of the luminance signal processing part 212, the chrominance signal processing part 213, and the audio signal processing part 214.

Next, a description is given of the frequency layout of the output signal of the mixer 215.

Figure 4:
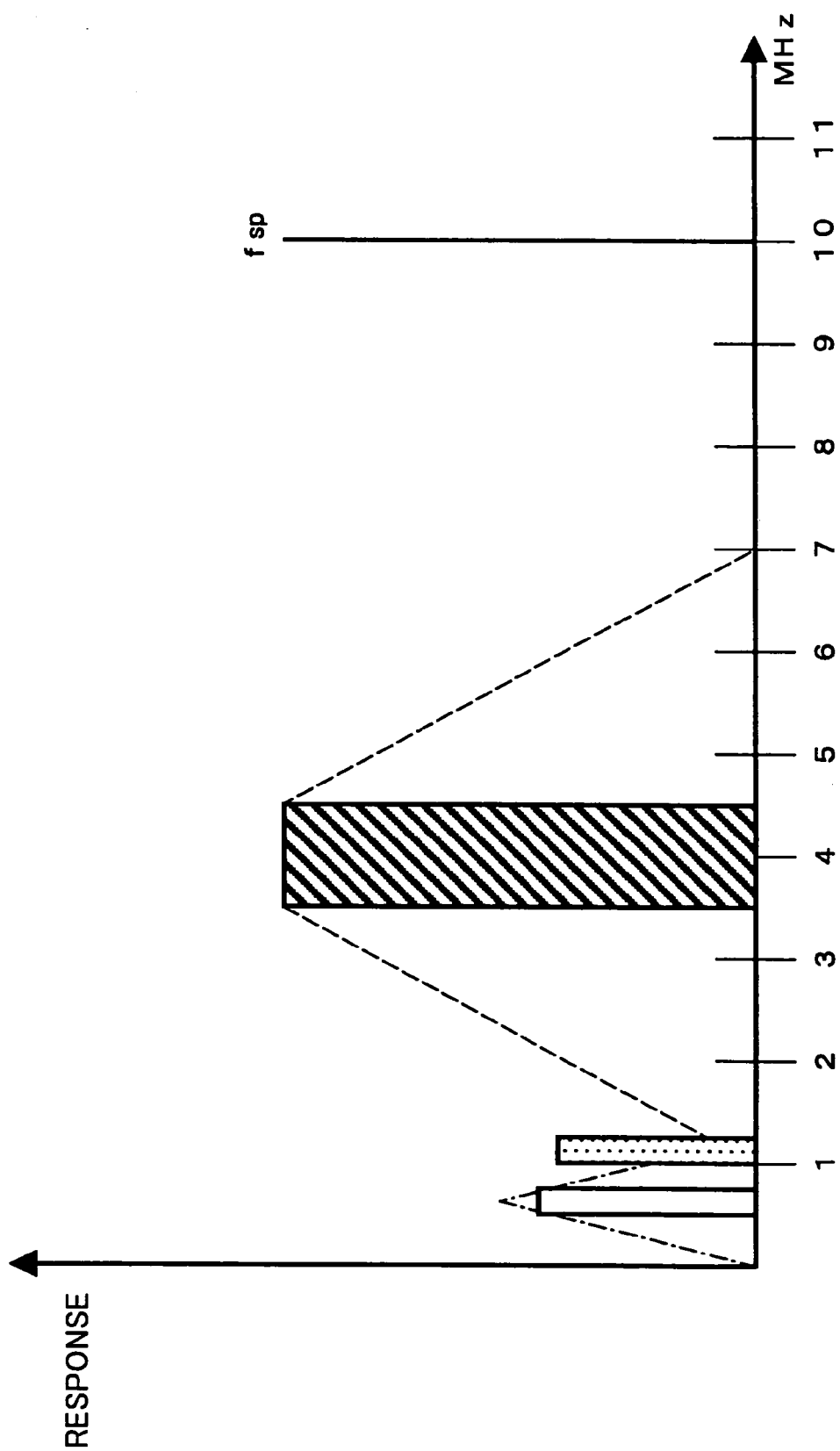
FIG. 4 is a diagram showing the frequency layout of the output signal of a mixer of the signal processing circuit according to the embodiment of the present invention.

FIG. 4 is a diagram showing the frequency layout of the output signal of the mixer 215.

In the output signal of the mixer 215, the luminance signal shows a frequency characteristic as indicated by a broken line in FIG. 4, and the necessary signal components of the luminance signal are frequency-modulated in a 1 MHz frequency bandwidth of 3.4 to 4.4 MHz as indicated by hatching in FIG. 4. The chrominance signal shows a frequency characteristic as indicated by a dot-dash line in FIG. 4, and the necessary signal components of the chrominance signal are frequency-converted to approximately 629 kHz, where unnecessary components of the luminance signal attenuate sufficiently, as indicated by a white rectangle in FIG. 4. Further, the audio signal is inserted at 1.2 MHz, where unnecessary components of the luminance signal and the chrominance signal attenuate, as indicated by dots in FIG. 4.

The output signal of the mixer 215 is supplied to the A/D conversion part 42 as the output signal of the signal processing circuit 41. The A/D conversion part 42 performs 1-bit quantization on the frequency-modulated output signal of the mixer 215, and converts the output signal of the mixer 215 into digital data.

Next, a description is given of the A/D conversion part 42.

Figure 5:
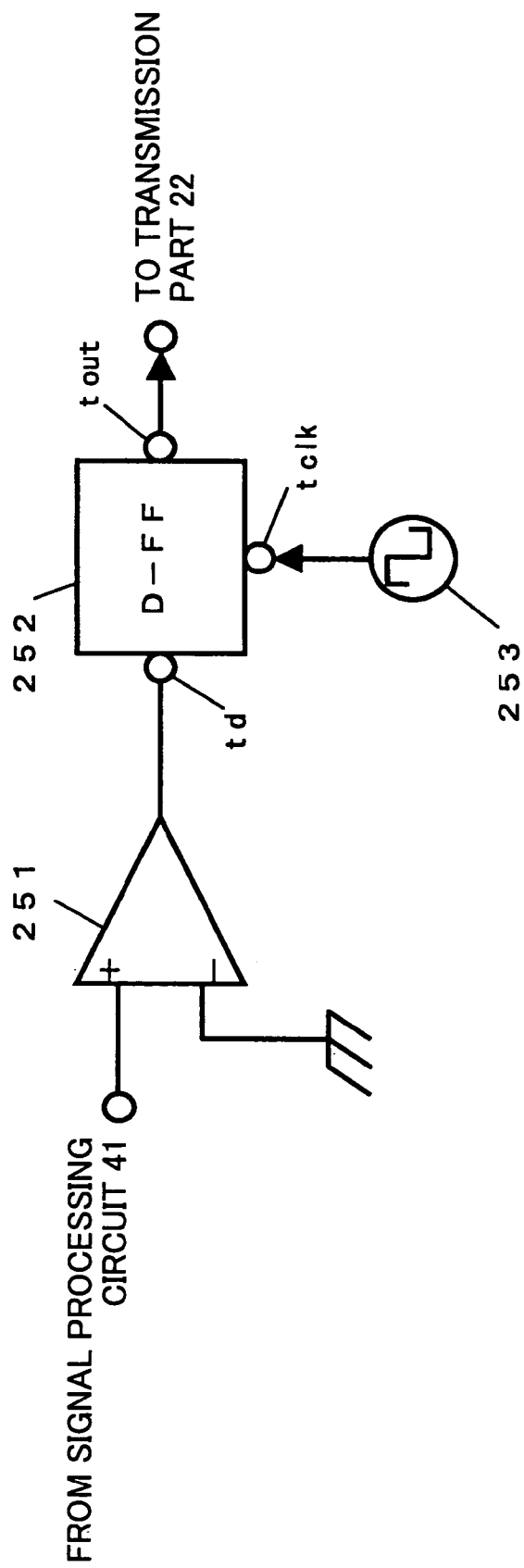
FIG. 5 is a block diagram showing an A/D conversion part of the transmitter according to the embodiment of the present invention.

FIG. 5 is a block diagram showing the A/D conversion part 42. The A/D conversion part 42 includes a compactor 251, a D-type flip-flop 252, and a clock generator circuit 253.

Figure 6:
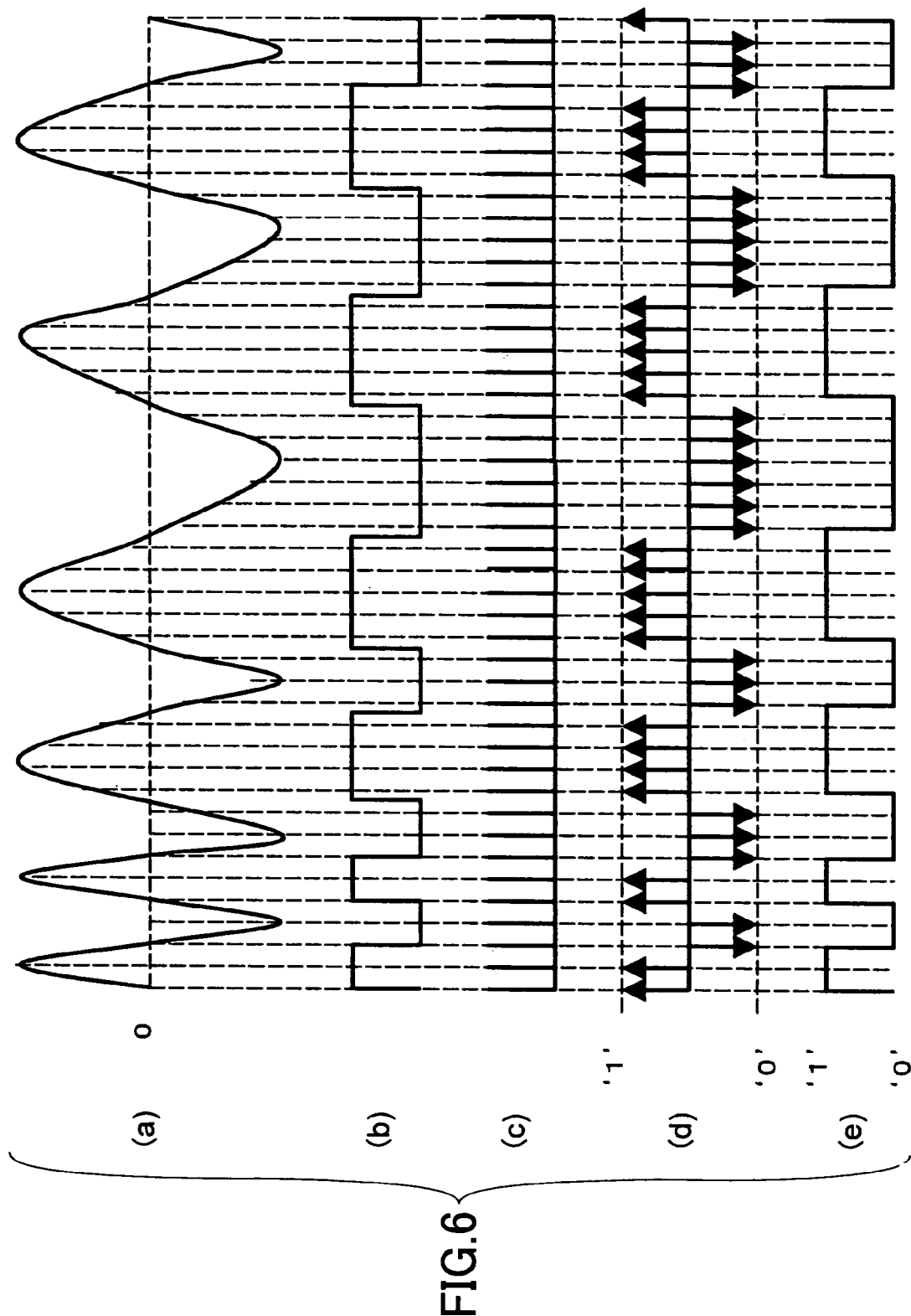
FIG. 6 is a diagram showing the operation waveforms of the A/D conversion part according to the embodiment of the present invention.

FIG. 6 is a diagram showing the operation waveforms of the A/D conversion part 42. In FIG. 6, (a) indicates the frequency-modulated signal supplied from the signal processing circuit 41, (b) indicates the output of the comparator 251, (c) indicates clock pulses generated in the clock generator circuit 253, (d) indicates sampling outputs in the D-type flip-flop 252, and (e) indicates the output of the D-type flip-flop 252.

The analog signal frequency-modulated as shown in (a) of FIG. 6 is supplied from the signal processing circuit 41 to the non-inverting input terminal of the comparator 251. The inverting input terminal of the comparator 251 is at zero potential, or grounded. As a result, the output signal of the signal processing circuit 41 is determined to be HIGH or LOW based on the zero level as shown in (b) of FIG. 6.

The output of the comparator 251 shown in (b) of FIG. 6 is supplied to the data terminal $t_d$ of the D-type flip-flop 252. Further, the clock pulses as shown in (c) of FIG. 6 are supplied from the clock generator circuit 253 to the clock terminal $t_{clk}$ of the D-type flip-flop 252. The clock pulses generated in the clock generator circuit 253 are a sampling clock signal, whose frequency fsp is required to be higher than or equal to 8.8 MHz, double the frequency of 4.4 MHz defining the higher side of the frequency band required for the luminance signal. The frequency fsp may be set to approximately 10 MHz.

The D-type flip-flop 252 samples the data supplied to the data terminal $t_d$ when the clock pulses supplied to the clock terminal $t_{clk}$ rise as shown in (d) of FIG. 6. As a result, the output signal as shown in (e) of FIG. 6 is output from the output terminal tout of the D-type flip-flop 252.

Thus, the digital data, 1-bit quantized by the A/D conversion part 42, is obtained.

The digital data, 1-bit quantized by the A/D conversion part 42, is supplied to the transmission part 22. The transmission part 22 performs, for instance, QPSK (quadrature phase shift keying) using the output digital data of the A/D conversion part 42. Then, the transmission part 22 amplifies the modulated signal, and outputs the modulated signal from the antenna 23. The modulation method in the transmission part 22 is not limited to QPSK, but may be other modulation methods such as FSK (frequency shift keying) and 64 QAM (quadrature amplitude modulation). The present invention is not limited by the modulation method in the transmission part 22.

Next, a description is given of the receiver 13.

The receiver 13 includes an antenna 31, a reception part 32, and a signal processing part 33. A signal (the modulated signal transmitted from the antenna 23 of the transmitter 12, for instance) received by the antenna 31 is supplied to the reception part 32. The reception part 32, which is composed of a single-chip IC, for instance, demodulates the signal modulated in the transmission part 22 to the digital data shown in (e) of FIG. 6. The signal demodulated in the reception part 32 is supplied to the signal processing part 33.

The signal processing part 33, which is composed of a single-chip IC, for instance, contains a digital-to-analog conversion part 51 and a signal processing circuit 52. The signal processing part 33 converts the digital data supplied from the reception part 32 to the video and audio signals output from the signal source 11.

A description is give first of the D/A conversion part 51.

Figure 7:
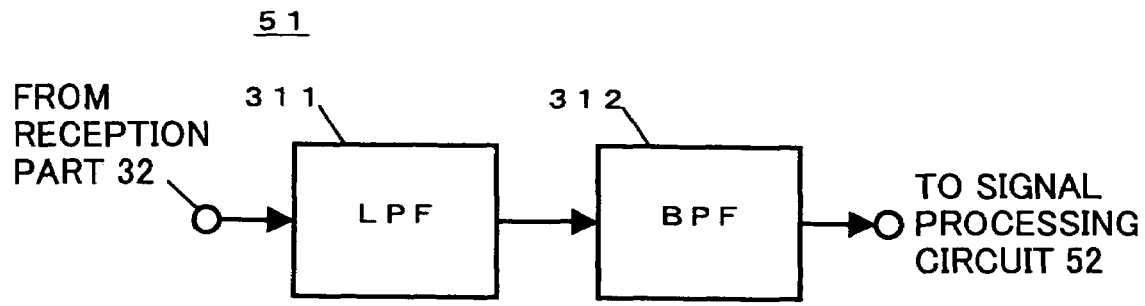
FIG. 7 is a block diagram showing a D/A conversion part of a receiver according to the embodiment of the present invention.

FIG. 7 is a block diagram showing the D/A conversion part 51.

The D/A conversion part 51 includes a low-pass filter 311 and a bandpass filter 312. The 1-bit quantized digital data as shown in (e) of FIG. 6, for instance, is supplied from the reception part 32 to the low-pass filter 311.

The low-pass filter 311 passes low-frequency components of and removes high-frequency components from the digital data supplied from the reception part 32. The signal passing through the low-pass filter 311 is supplied to the bandpass filter 312. The bandpass filter 312 passes signals of a frequency band including signal components of the signal supplied from the low-pass filter 311, and removes signals of unnecessary frequency components therefrom.

As a result, a signal whose frequency varies in accordance with the frequency-modulated signal shown in (a) of FIG. 6 can be obtained. In this embodiment, the signal shown in (e) of FIG. 6 supplied from the reception part 32 is applied to the low-pass filter 311 and the bandpass filter 312 as the D/A conversion part 51. The signal supplied from the reception part 32, however, has a varying frequency in accordance with the frequency-modulated signal shown in (a) of FIG. 6. Accordingly, the signal may be directly supplied to the signal processing circuit 52 without passing through the D/A conversion part 51.

Next, a description is given of the signal processing circuit 52.

Figure 8:
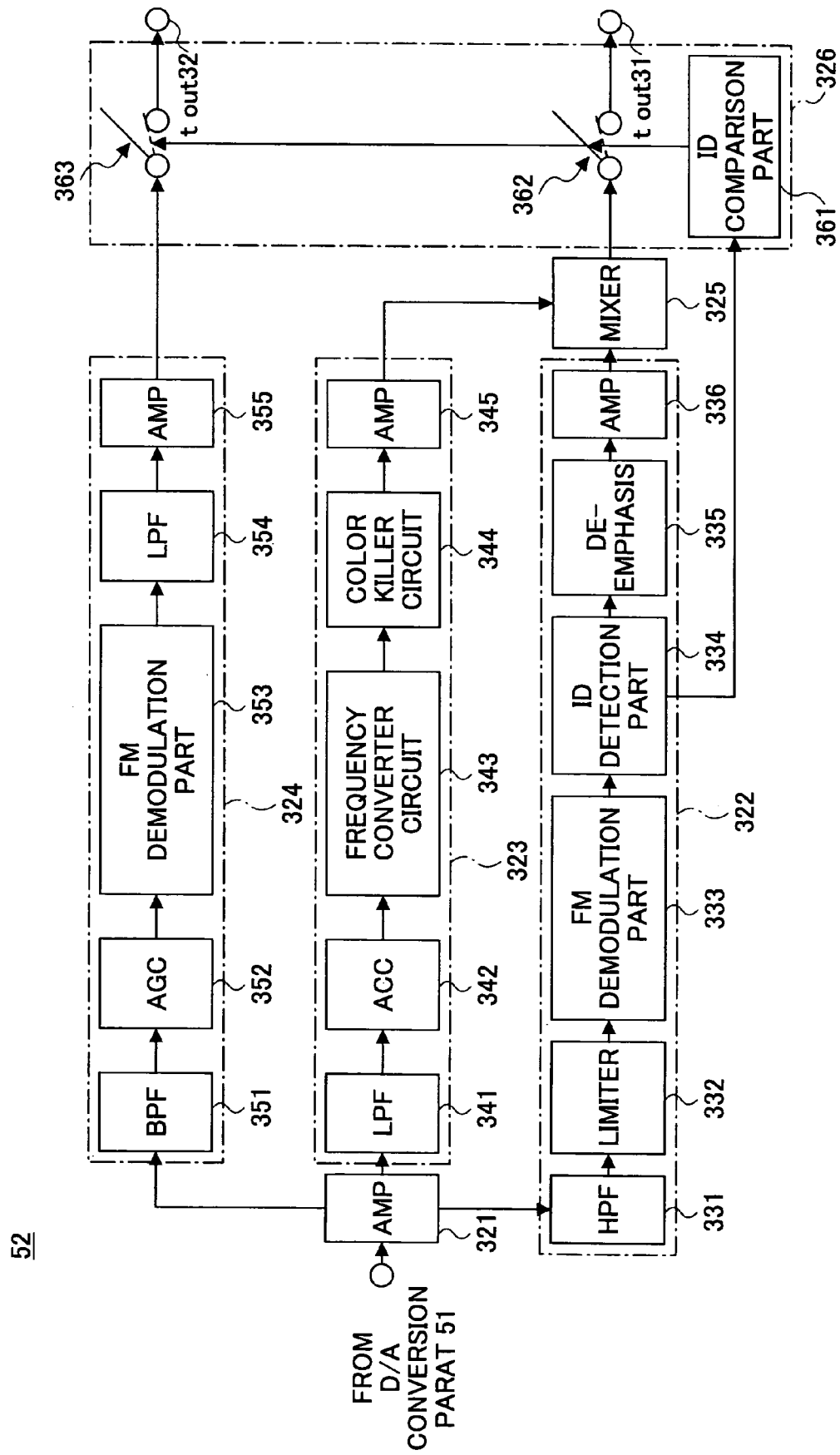
FIG. 8 is a block diagram showing a signal processing circuit of the receiver according to the embodiment of the present invention.

FIG. 8 is a block diagram showing the signal processing circuit 52.

The signal processing circuit 52 includes an amplifier circuit 321, a luminance signal processing part 322, a chrominance signal processing part 323, an audio signal processing part 324, a mixer 325, and an output control part 326.

The amplifier circuit 321 is supplied with the output signal of the D/A conversion part 51. The amplifier circuit 321 amplifies the signal supplied from the D/A conversion part 51. The signal amplified by the amplifier circuit 321 is supplied to the luminance signal processing part 322, the chrominance signal processing part 323, and the audio signal processing part 324.

The luminance signal processing part 322 includes a high-pass filter 331, a limiter 332, an FM demodulation part 333, an ID detection part 334, a de-emphasis circuit 335, and an amplifier circuit 336.

The high-pass filter 331 passes high-frequency component signals including luminance signal components of the signal supplied from the amplifier circuit 321. For instance, the high-pass filter 331 passes signals higher than or equal to 3.0 MHz. Thereby, only the luminance signal components can be extracted.

The signal passing through the high-pass filter 331 is supplied to the limiter 332. The limiter 331 limits the upper limit level and the lower limit level of the signal passing through the high-pass filter 331.

The signal passing through the limiter 332 is supplied to the FM demodulation part 333. The FM demodulation part 333 performs FM demodulation on the signal passing through the limiter 332, and restores the luminance signal as shown in (c) of FIG. 3. The luminance signal shown in (c) of FIG. 3 restored in the FM demodulation part 333 is supplied to the ID detection part 334.

The ID detection part 334 extracts the ID signals Sid inserted into the vertical synchronizing pulses V.SYNC included in the luminance signal shown in (c) of FIG. 3. The ID signals Sid extracted in the ID detection part 334 are supplied to the output control part 326. Further, the ID detection part 334 passes the luminance signal to the de-emphasis circuit 335.

The de-emphasis circuit 335, including a low-pass filter, suppresses the high-frequency components emphasized in the pre-emphasis circuit 222 of the transmitter 12, and reproduces the luminance signal output from the signal source 11. The signal subjected to high-frequency suppression in the de-emphasis circuit 335 is supplied to the amplifier circuit 336. The amplifier circuit 336 amplifies the luminance signal and supplies the luminance signal to the mixer 325.

Next, a description is given of the chrominance signal processing part 323.

The chrominance signal processing part 323 includes a low-pass filter 341, an ACC circuit 342, a frequency converter circuit 343, a color killer circuit 344, and an amplifier circuit 345.

The low-pass filter 341 passes the frequency components of the chrominance signal, that is, low-frequency components including 629 kHz, such as signals lower than or equal to 700 kHz, of the signal supplied from the amplifier circuit 321, and removes the frequency components of, for instance, the luminance and audio signals therefrom. The signal passing through the low-pass filter 341 is supplied to the ACC circuit 342.

The ACC circuit 342 controls the amplitude of the chrominance signal passing through the low-pass filter 341. The signal, whose amplitude has been controlled in the ACC circuit 342, is supplied to the frequency converter circuit 343.

The frequency converter circuit 343 performs frequency conversion to convert the chrominance signal to a signal of its original frequency band. The chrominance signal subjected to frequency conversion is supplied to the color killer circuit 344. The color killer circuit 344 shuts off the chrominance signal when the video signal is monochrome and passes the chrominance signal when the video signal is color.

The signal passing through the color killer circuit 344 is supplied to the amplifier circuit 345. The amplifier circuit 345 amplifies the signal passing through the color killer circuit 344. The signal amplified by the amplifier circuit 345 is supplied to the mixer 325.

Next, a description is given of the audio signal processing part 324.

The audio signal processing part 324 includes a bandpass filter 351, an AGC circuit 352, an FM demodulation part 353, a low-pass filter 354, and an amplifier circuit 355.

The bandpass filter 351 passes the frequency components of the audio signal, that is, signals of a frequency band including 1 MHz and its neighborhood of the signal supplied from the amplifier circuit 321, and removes the frequency components of, for instance, the luminance and chrominance signals therefrom. The audio signal passing through the bandpass filter 351 is supplied to the AGC circuit 352. The AGC circuit 352 performs gain control so as to make constant the amplitude of the audio signal passing through the bandpass filter 351.

The audio signal, whose amplitude has been made constant in the AGC circuit 352, is supplied to the FM demodulation part 353. The FM demodulation part 353 performs FM demodulation on the audio signal supplied from the AGC circuit 352. The audio signal subjected to FM demodulation in the AGC circuit 352 is supplied to the low-pass filter 354. The low-pass filter 354 passes low-frequency components and removes high-frequency noises.

The audio signal, whose high-frequency noises have been removed by the low-pass filter 354, is supplied to the amplifier circuit 355. The amplifier circuit 355 amplifies the audio signal passing through the low-pass filter 354. Then, the audio signal is supplied to the output control part 326.

The mixer 325 mixes the luminance signal supplied from the luminance signal processing part 322 and the chrominance signal supplied from the chrominance signal processing part 323, and generates a composite video signal. The composite video signal generated in the mixer 325 is supplied to the output control part 326. The output control part 326 includes an ID comparison part 361 and switches 362 and 363.

The ID comparison part 361 is supplied with the ID signals Sid detected in the ID detection part 334. The ID comparison part 361 compares the ID signals Sid with a set ID preset in the receiver 13. If the result of the comparison by the ID comparison part 361 shows that the ID signals Sid supplied from the ID detection part 334 match the set ID preset in the receiver 13, the switch 362 is turned ON to output the composite video signal generated in the mixer 325 from an output terminal $T_{out31}$, and the switch 363 is turned ON to output the audio signal output from the amplifier circuit 355 from an output terminal $T_{out32}$. If the ID signals Sid do not match the set ID, the switch 362 is turned OFF to shut off the outputting of the composite video signal from the output terminal $T_{out31}$, and the switch 363 is turned OFF to shut off the outputting of the audio signal from the output terminal $T_{out32}$.

The output control part 326 thus enables the receiver 13 to receive only the video and audio signals having a matching ID supplied from the transmitter 12.

The output terminals $T_{out31}$ and $T_{out32}$ are connected with the image receiver 14. The image receiver 14 is composed of, for instance, a television receiver. The image receiver 14 displays video based on the video signal supplied from the output terminal $T_{out31}$, and outputs audio based on the audio signal supplied from the output terminal $T_{out32}$.

According to the above-described configuration, the video signal and the audio signal output from the signal source 11 can be transmitted wirelessly from the transmitter 12 to the receiver 13, and can be received and output by the image receiver 14.

According to this embodiment, a transmission signal (a signal to be transmitted) is subjected to frequency modulation and 1-bit quantization to be converted into digital data, and is transmitted as digital data. The transmitted digital data is directly subjected to FM demodulation, thereby demodulating the transmission signal. Accordingly, there is no need to compress the transmission signal or convert the transmission signal into packets. That is, the digital data can be transmitted without performing complicated processing such as compression, and the receiver side can restore the original transmission signal by directly demodulating the received digital data according to frequency modulation. Accordingly, complicated processing such as compression and decompression of the digital data are unnecessary on the transmitter and receiver ends. Therefore, signal transmission delay can be minimized. Therefore, digital transmission can be performed with reduced delay with an extremely simple configuration, thus reducing costs.

Further, according to this embodiment, the transmission signal can be transmitted successively like an analog transmission. Accordingly, even if the signal is temporarily lost during transmission, unlike in the case of transmitting digital data compressed by MPEG or JPEG, this may have only a slight influence such as superimposition of noise on video or audio, thus causing no great disorder.

According to this embodiment, the communications between the transmitter 12 and the receiver 13 are performed by digital transmission, and an object of communication is specified by an ID. Accordingly, a standardized wireless communication method such as the 2.4 GHz band wireless LAN may be employed as the wireless communication method between the transmitter 12 and the receiver 13.

Further, according to this embodiment, the video and audio signals to be transmitted are analog. The transmission signal, however, is not limited to an analog signal, but may be either analog or digital signal. The present invention is not limited by the transmission signal.

The present invention is not limited to the specifically disclosed embodiment, and variations and modifications may be made without departing from the scope of the present invention.

The present application is based on Japanese priority patent application No. 2003-051269, filed on Feb. 27, 2003, the entire contents of which are hereby incorporated by reference.

What is claimed is:

1. A communication system for transmitting a transmission signal in digital form from a transmitter to a receiver, wherein:

the transmitter comprises:
   a modulation part modulating a carrier wave in accordance with the transmission signal according to frequency modulation;
   a digital conversion part performing 1-bit quantization on a modulated signal obtained as a result of the modulation in the modulation part; and the receiver comprises:
   a reception part receiving the digital data transmitted from the transmission part; and
   a demodulation part demodulating the digital data received by the reception part according to the frequency modulation, wherein the digital conversion part of the transmitter includes a comparator and a flip-flop circuit, the comparator having a non-inverting input and a grounded inverting input, and the digital conversion part performs the 1-bit quantization by inputting the modulated signal to the non-inverting input of the comparator, supplying an output of the comparator to the flip-flop circuit, and causing the flip-flop circuit to sample the output of the comparator at a rise time of a sampling clock signal supplied thereto.

2. The communication system as claimed in claim 1, wherein:
 the transmitter further comprises
  an identification information insertion part inserting identification information into the transmission signal; and
 the receiver further comprises:
  an identification information extraction part extracting the inserted identification information from a demodulated signal obtained as a result of the demodulation in the demodulation part; and
  an output control part enabling the demodulated signal to be output when the extracted identification information matches preset identification information, and disabling the demodulated signal from being output when the extracted identification information fails to match the preset identification information.

3. A communication device for transmitting a transmission signal in digital form, comprising:
 a modulation part modulating a carrier wave in accordance with the transmission signal according to frequency modulation;
 a digital conversion part performing 1-bit quantization on a modulated signal obtained as a result of the modulation in the modulation part; and
 a transmission part transmitting digital data into which the modulated signal is converted in the digital conversion part,
 wherein the digital conversion part includes a comparator and a flip-flop circuit, the comparator having a non-inverting input and a grounded inverting input, and
 the digital conversion part performs the 1-bit quantization by inputting the modulated signal to the non-inverting input of the comparator, supplying an output of the comparator to the flip-flop circuit, and causing the flip-flop circuit to sample the output of the comparator at a rise time of a sampling clock signal supplied thereto.

4. The communication device as claimed in claim 3, further comprising an identification information insertion part inserting identification Information into the transmission signal.

5. The communication device as claimed in claim 4, wherein the transmitted digital data is received by a receiver; and the identification information is preset in the receiver.

* * * * *